J. H. LYNN.
SECTIONAL SPRING TIRE.
APPLICATION FILED MAR. 8, 1916.
1,195,049.
Patented Aug. 15, 1916.
2 SHEETS—SHEET 1.
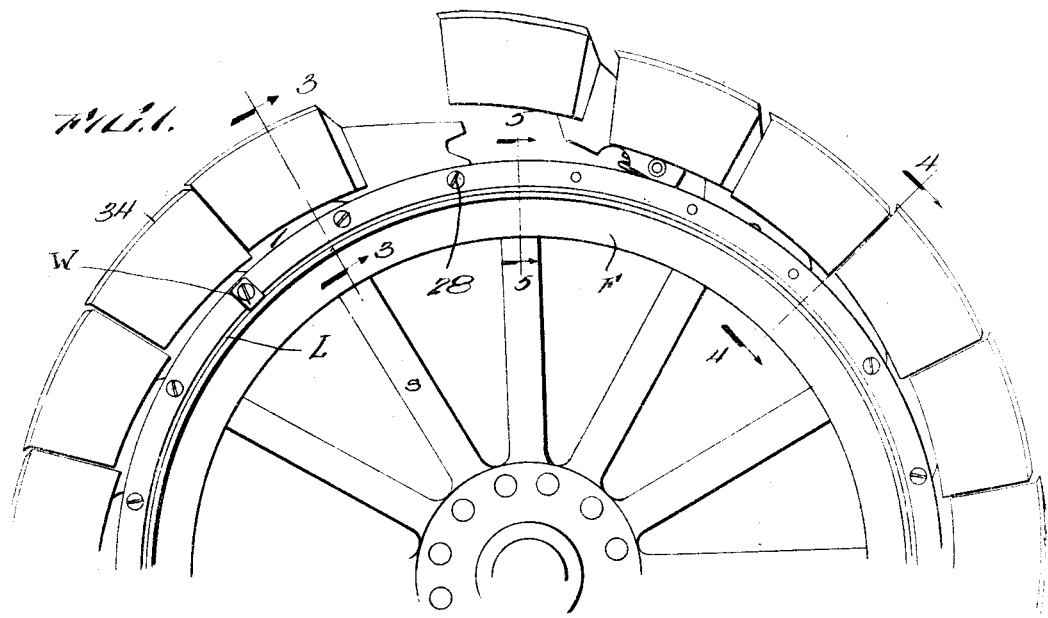
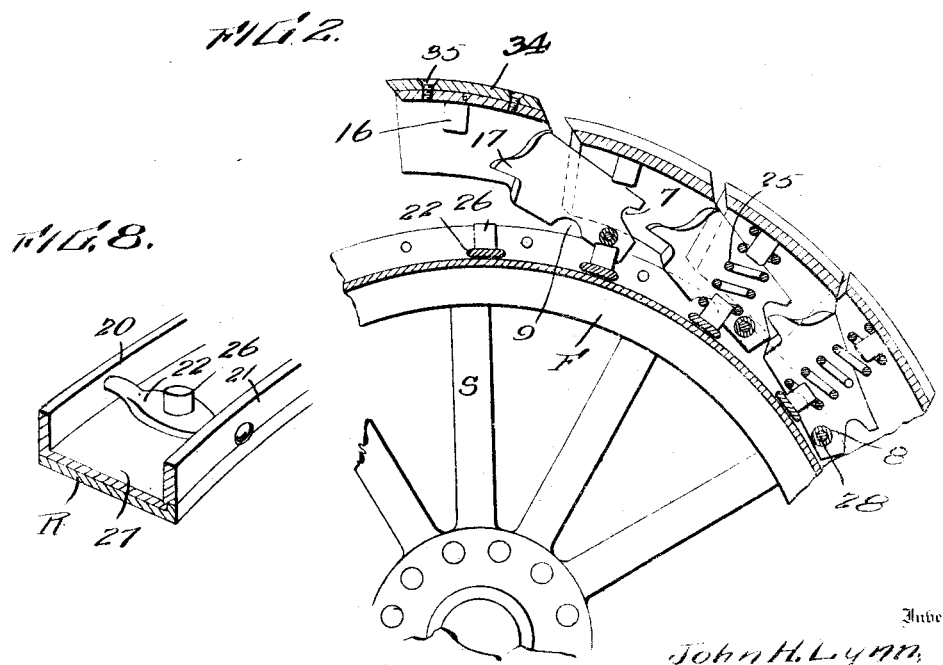
Inventor
John H. Lynn
By Mason Fenwick Lawrence,
Attorneys

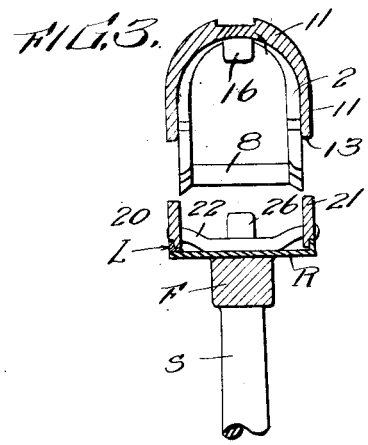
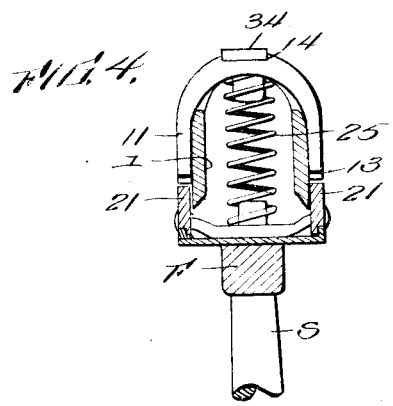
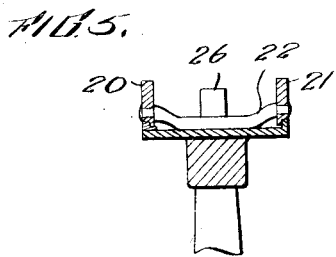
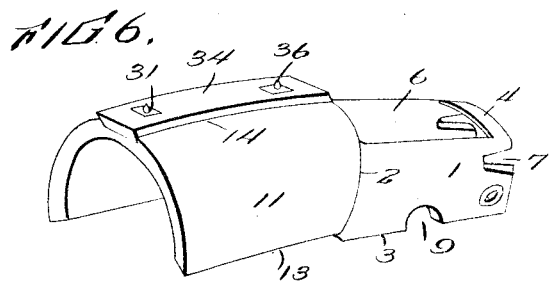
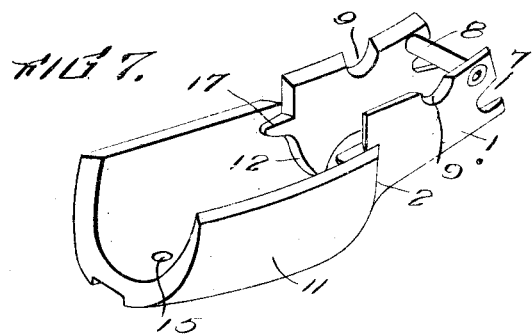

UNITED STATES PATENT OFFICE.

JOHN HENRY LYNN, OF COPLAY, PENNSYLVANIA.

SECTIONAL SPRING-TIRE.

1,195,049.　　　　Specification of Letters Patent.　　Patented Aug. 15, 1916.

Application filed March 8, 1916. Serial No. 82,965.

*To all whom it may concern:*

Be it known that I, JOHN H. LYNN, a citizen of the United States, residing at Coplay, in the county of Lehigh and State of Pennsylvania, have invented certain new and useful Improvements in Sectional Spring-Tires; and I do hereby declare the following to be a full, clear, and exact description of the invention, such as will enable others skilled in the art to which it appertains to make and use the same.

This invention relates to cushion tires, and more especially to those of metal made in sections; and the object of the same is broadly to produce a serviceable tire of this character whose sections interlock when they are in place so that they cannot be accidentally disconnected from each other or from the base which supports them.

Details will be set forth in the following specification and are shown in the drawings wherein:—

Figure 1 is a side elevation of the upper portion of a wheel provided with this tire, one of the sections being removed and others loosened up; and Fig. 2 is a longitudinal section through the same portion of the wheel and in the plane of such wheel, one tread section being in place. Fig. 3 is a cross section taken on about the line 3—3 of Fig. 1 excepting that the female member is raised abnormally from the male member and the spring and tread are omitted; and Figs. 4 and 5 are cross sections through the complete tire on the lines 4—4 and 5—5 respectively of Fig. 1. Figs. 6 and 7 are details of one member, showing respectively its outside and its inside. Fig. 6 shows a slight modification which will be explained below. Fig. 8 is a detail of a modified form of the base.

The spokes S carry the usual felly F and rim R, and if this tire is demountable the rim R will by preference have a permanent flange at one edge while a locking ring L passes over its other edge and may be held thereon by occasional washers as indicated at W in Fig. 1. However, this tire may be mounted permanently on the rim R, and the demountable feature forms no part of the present invention.

The tire is made up of metal sections which are duplicates and are shaped externally and internally as perhaps best seen in Figs. 6 and 7; and with these sections are associated other parts for carrying them and holding them in place as will be described.

Each section is curved longitudinally in an arc forming part of the circle inscribed by the tire when in place, and each section is also by preference rounded or arched transversely as best seen in Figs. 3 and 4, so that the general appearance of the tire is the same as that of cushion and pneumatic tires of rubber now in common use. Each section is made up of a smaller or male portion 1 at one end and a larger or female portion 11 at the other end, the female portion being cut out internally so that it will overlie the male portion of the next adjacent member. These portions are integrally united at their contiguous ends at the points 2, and as the female portion or member is wider than the male member these points of union produce shoulders. The sides of the male member terminate in edges 3 which are relatively lower than the lower edges 13 of the female member, and as the sides of the latter project laterally beyond those of the male member so as to produce the shoulder 2 above referred to, the lower edges 13 also produce downwardly facing shoulders. The body of the female member is arched as best seen in Fig. 3 and grooved along its outer face as at 14, the groove being provided at intervals with holes 15 for a purpose yet to appear, and at about its mid-length this member contains an inwardly projecting stud 16 also for a purpose yet to be described. Internally the juncture between the two members produces shoulders as seen at 12 in Fig. 3, and projecting forward from these shoulders within the female member are tongues 17. The sides of the male member are likewise arched, and they may be connected with each other at what might be called the rear end of this member which is remote from the female member, the connection being shown at 4 in Fig. 6 only; but otherwise the top or curved arch of this member is omitted so as to produce an opening 6. Notches 7 are formed in the rear ends of said sides, and are of a size and shape to loosely engage the tongues 17 in the female member of the next adjacent section. Below said notches said sides are connected by a tube or sleeve 8, and in the lower edges of said sides are other notches 9.

The base for this tire is made up essentially of two side walls or rings 20 and 21 standing on edge, and connected with each other at intervals by cross bars 22 which carry studs 26 opposite those numbered 16 within the sections; and coiled expansive springs 25 have their ends respectively engaged with the studs 16 and 26. I may here say that as these studs are the usual devices for engaging the ends of springs, they could be replaced by sockets or other similar devices without departing from my invention. Said base may have a bottom plate 27 as shown in Fig. 8, or not, but in any case the base slips over the rim R of the wheel and is held thereon by some means, such as the locking ring L, in case it is demountable. Across this base at points between the cross bars are passed bolts 28 which may have the usual heads and nuts, with or without washers as desired, and certain of said washers as indicated at W may form part of the demountable mechanism; and these bolts pass through the tubes or sleeves 8 of the sections, so that the latter are pivotally mounted thereon.

When in place the lower edge 3 of each male section may rest on the bottom 27 of the base, as its notches 9 overlie the cross bar 22, and the lower edges 13 of its corresponding female member may rest on the upper or outer edge of the rings 20 and 21. Indeed, this is the position of parts at the bottom of the wheel when the tire is under pressure. At the top of the wheel, however, the expansive force of the spring 25 raises the female member so that its lower edges are lifted off the rings of the base, and in rising its tongues 17 are permitted to move slightly in the notches 7 of the next adjacent member, which notches are made rather large with this very purpose in view. The spring extends from the inner stud 26, outward between the sides of the male member and through its open top, and engages the stud 26 in the section next to the rear. Yet the engagement of the tongues 17 with the notches 7 prevents the spring from throwing the female member too far outward. The traction is carried from each section through its pivot bolt and the sleeve 8 to the rings of the base, and the latter is of course clamped on the wheel.

The tread of this improved tire is also made in sections, and each section is by preference a strip 34 of steel which may be held in the groove 14 by ordinary screws or bolts 35 engaging the holes 15, so that when the steel strip becomes worn it can be replaced. Obviously these screws or bolts could have their heads of any appropriate shape and counter-sunk if desired as shown at 31 in Fig. 6, and they might each carry a projection or spur 36 so that the tip of the spur will project and will of course enter the roadway, and just to this extent the wheel has a certain cling which is highly desirable as in times of icy or slippery roads or streets.

What I claim is:

1. In a sectional tire, the combination with a base having outturned edges, bolts connecting the latter at intervals, and studs in the base alternated with said bolts; of sections overlapping each other and each comprising a smaller male member pivoted on one of said bolts between the outturned edges of the base and open at its top, and a larger female member arched to overlie the male member of the next adjacent section and with its edges overlying those of the base, means loosely connecting the meeting ends of the male members, a stud in the arch of each female member opposite one of the studs in the base, and an expansive spring connecting said studs.

2. In a sectional tire, the combination with a base including spaced rings lying in parallelism, cross bars connecting them at intervals, and bolts connecting them between the cross bars; of sections whereof each comprises a male member having its sides standing between said rings and pivoted on one of said bolts and its inner edges notched to pass over the adjacent cross bar, the top of this member being open, and an arched female member integral with one end of the male member with its inner edges adapted to contact with the outer edges of said rings, an expansive spring between each cross bar and the overlying female member, and means for loosely connecting the contiguous ends of the male members.

3. In a sectional tire, the combination with a base including spaced rings lying in parallelism, cross bars connecting them at intervals, and bolts connecting them between the cross bars; of sections whereof each comprises a male member having its sides standing between said rings and pivoted on one of said bolts and its inner edges notched to pass over the adjacent cross bar, the top of this member being open, and an arched female member integral with one end of the male member with its inner edges adapted to contact with the outer edges of said rings, the sides of the female member forming internal shoulders at their points of juncture with the sides of its male member, tongues projecting from said shoulders into the female member, the remote ends of the male member having notches in its sides for loosely receiving such tongues of the next section, and an expansive spring between the arch of the female member and the underlying cross bar of the base.

4. In a sectional tire, the combination with a channeled base adapted for attachment to the wheel rim; of a series of arched sections, each comprising a male member whose sides pass between those of the base and are pivoted at their rear ends therein and notched above said pivots, the upper edges of said sides being connected at the rear end and otherwise open, and an arched female member whose sides are integrally united with the front ends of the sides of the male member to produce internal shoulders, tongues projecting forward from said shoulders and adapted to loosely engage the notches of the section next adjacent, and an expansive spring between the arch of the female member and the base.

5. In a sectional tire, the combination with a base having outturned edges, and bolts connecting the latter at intervals; of sections overlapping each other and each comprising a smaller male member pivoted on one of said bolts and a larger female member arched to overlie the male member of the next adjacent section, means loosely connecting the meeting ends of the male members, and an expansive spring between the arch of the female member and the base.

6. In a sectional tire, the combination with a base including spaced rings, cross bars connecting them at intervals, and bolts connecting them between the cross bars; of sections whereof each comprises a male member having its sides pivoted on one of said bolts and its inner edges notched to pass over the adjacent cross bar, and an arched female member integral with one end of the male member, an expansive spring between each cross bar and the overlying female member, and means for loosely connecting the contiguous ends of the male members.

In testimony whereof I affix my signature in presence of two witnesses.

JOHN HENRY LYNN.

Witnesses:
BURTIS A. LAUB,
JONAS F. MOYER.

Copies of this patent may be obtained for five cents each, by addressing the "Commissioner of Patents, Washington, D. C."